(12) United States Patent
Sivadas et al.

(10) Patent No.: US 9,316,431 B2
(45) Date of Patent: Apr. 19, 2016

(54) METHOD OF REGULATING A REFRIGERATION DEVICE BY STORING THERMAL ENERGY DURING NON-PEAK HOURS FOR USE DURING PEAK HOURS IN ORDER TO SHIFT REFRIGERATION DEVICE OPERATION TO NON-PEAK HOURS

(71) Applicants: Vishnu Sivadas, Folsom, CA (US); Timothy Lee Lockwood, Rescue, CA (US)

(72) Inventors: Vishnu Sivadas, Folsom, CA (US); Timothy Lee Lockwood, Rescue, CA (US)

(*) Notice: Subject to any disclaimer, the term of this patent is extended or adjusted under 35 U.S.C. 154(b) by 0 days.

(21) Appl. No.: 14/668,684

(22) Filed: Mar. 25, 2015

(65) Prior Publication Data
US 2016/0040926 A1 Feb. 11, 2016

Related U.S. Application Data

(60) Provisional application No. 62/035,084, filed on Aug. 8, 2014.

(51) Int. Cl.
| G05D 23/32 | (2006.01) |
| F25D 29/00 | (2006.01) |
| H02J 3/14 | (2006.01) |
| F25D 11/00 | (2006.01) |
| F25B 49/00 | (2006.01) |

(52) U.S. Cl.
CPC ............... *F25D 29/003* (2013.01); *H02J 3/14* (2013.01); *F25B 49/005* (2013.01); *F25D 11/00* (2013.01); *F25D 2700/12* (2013.01); *H02J 2003/143* (2013.01); *Y02B 70/3225* (2013.01); *Y02B 70/3233* (2013.01); *Y02B 70/3241* (2013.01); *Y04S 20/222* (2013.01); *Y04S 20/225* (2013.01); *Y04S 20/227* (2013.01)

(58) Field of Classification Search
CPC ...... F25B 49/005; F25B 49/02; F25B 49/022; F25D 29/00; F25D 2700/12; F25D 11/00; F25D 11/006; F24F 11/0086; F24F 11/006; F24F 11/08; G01K 1/024; H02J 3/14; H02J 2003/143; Y02B 70/3225; Y02B 72/3233; Y02B 70/3241; Y04S 20/222; Y04S 20/225; Y04S 20/227
USPC ......... 62/126, 157, 158, 228.1, 231; 700/276, 700/278, 295, 296; 340/870.17
See application file for complete search history.

(56) References Cited

U.S. PATENT DOCUMENTS 8,548,635 B2* 10/2013 Watson ................. G06Q 50/06 700/295
2004/0117330 A1* 6/2004 Ehlers ................. F24F 11/0012 705/412

(Continued)

*Primary Examiner* — Marc Norman
*Assistant Examiner* — Paolo Gonzalez (57) ABSTRACT

The present invention is a method of regulating a refrigeration device by storing thermal energy during non-peak hours for use during peak hours in order to shift refrigeration device operation to non-peak hours. In a first iteration, a real-time temperature of the refrigeration device is cooled to a target temperature over a first time duration. The refrigeration device compressor and fan are disabled over a second time duration and the real-time temperature is allowed to slowly rise, never exceeding an established maximum temperature. The real-time temperature is periodically monitored over the first time duration and the second time duration and adjustments are made for a subsequent iteration if the target temperature is reached before the end of the first time duration, if the target temperature is not reached during the first time duration, and if the maximum temperature is reached during the second time duration.

13 Claims, 9 Drawing Sheets

(56) References Cited

U.S. PATENT DOCUMENTS

| | | | |
|---|---|---|---|
| 2007/0005195 A1* | 1/2007 | Pasquale | H02J 15/00 700/295 |
| 2007/0043478 A1* | 2/2007 | Ehlers | F24F 11/0012 700/276 |
| 2010/0004790 A1* | 1/2010 | Harbin, III | F24D 19/1051 700/291 |
| 2010/0146712 A1* | 6/2010 | Finch | G06Q 50/06 8/137 |
| 2010/0179708 A1* | 7/2010 | Watson | G06Q 50/06 700/296 |
| 2011/0095017 A1* | 4/2011 | Steurer | H02J 3/14 219/493 |
| 2011/0098869 A1* | 4/2011 | Seo | G01D 4/004 700/296 |
| 2011/0175742 A1* | 7/2011 | Shin | F25D 17/065 340/635 |
| 2011/0296852 A1* | 12/2011 | Wyn-Davies | F25D 29/00 62/56 |
| 2012/0029719 A1* | 2/2012 | Besore | G05D 23/1904 700/296 |
| 2012/0047921 A1* | 3/2012 | Besore | F25D 21/06 62/80 |
| 2012/0130559 A1* | 5/2012 | Besore | G05D 23/1923 700/300 |
| 2013/0268134 A1* | 10/2013 | Tuller | A41L 15/0047 700/291 |
| 2015/0276277 A1* | 10/2015 | Keleshian | F25B 5/04 62/236 |

* cited by examiner

METHOD OF REGULATING A REFRIGERATION DEVICE BY STORING THERMAL ENERGY DURING NON-PEAK HOURS FOR USE DURING PEAK HOURS IN ORDER TO SHIFT REFRIGERATION DEVICE OPERATION TO NON-PEAK HOURS

The current application claims a priority to the U.S. Provisional Patent application Ser. No. 62/035,084 filed on Aug. 8, 2014.

FIELD OF THE INVENTION

The present invention relates generally to a method of regulating the operation of a refrigeration unit. More specifically, the present invention is a method of regulating a refrigeration device by storing thermal energy during non-peak hours for use during peak hours in order to shift refrigeration device operation to non-peak hours.

BACKGROUND OF THE INVENTION

Energy consumption during typical peak energy demand periods can exert a considerable strain on an electric grid. Due to the significantly increased demand for energy during peak energy demand periods, widespread outages are common. This is particularly the case when a region is subjected to extreme temperatures in the summer and the winter. In addition to frequent outages, increased demand for energy often results in energy service providers responding by correspondingly increasing energy costs. As such, customers frequently face exorbitant energy costs during peak energy demand periods and must pay at the increased rates or reduce their energy usage to avoid additional charges.

The present invention is a method of regulating the operation of a refrigeration device in order to store thermal energy during non-peak hours for use during peak hours. The refrigeration device is able to maintain a targeted lowered temperature during non-peak hours until the start of a peak energy demand period or a time period that is designated for peak load shifting. The targeted lowered temperature is determined based on the requirements to maintain a safe temperature (i.e. for food) during the non-peak energy demand period when the refrigeration unit is not in operation. During the peak energy demand period, the refrigeration unit is disabled and the refrigeration unit temperature is allowed to steadily rise over the peak energy demand period. However, the refrigeration unit temperature is not allowed to rise above a designated maximum temperature and the refrigeration unit is allowed to operate normally if the refrigeration unit temperature reaches the maximum temperature. The object of the present invention is to allow the refrigeration device to operate during non-peak hours and remain offline during peak hours, thus reducing the power grid load during peak hours.

DETAIL DESCRIPTIONS OF THE INVENTION

All illustrations of the drawings are for the purpose of describing selected versions of the present invention and are not intended to limit the scope of the present invention.

Figure 1:
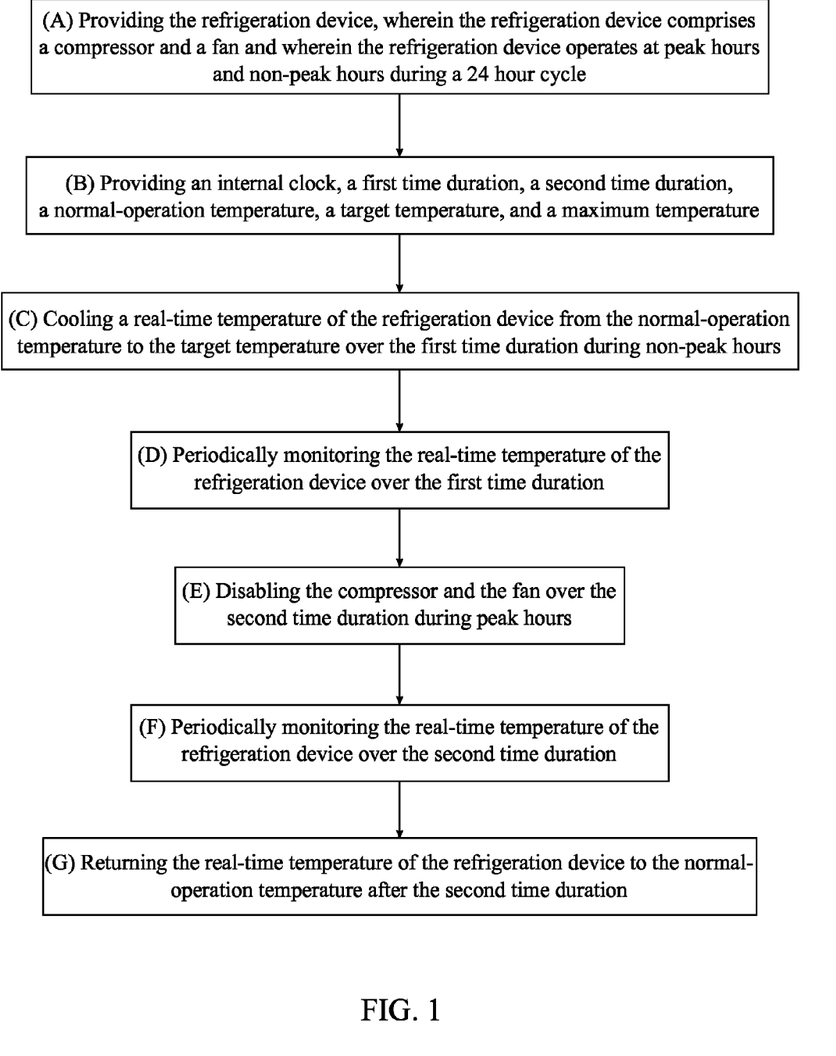
FIG. 1 is a flowchart illustrating the overall process that is followed by the present invention.

The present invention is a method of regulating a refrigeration device by storing thermal energy during non-peak hours for use during peak hours in order to shift refrigeration device operation to non-peak hours, effectively operating the refrigeration device during non-peak hours and keeping the refrigeration device out of operation during peak hours. The overall process followed by the present invention is shown in FIG. 1. The present invention is able to regulate the operation of a refrigeration device by regulating the compressor and the fan of the refrigeration device. The compressor is a key component in vapor-compression refrigeration and is utilized to compress incoming saturated vapor to a higher pressure, increasing the temperature of the vapor before the heated, compressed vapor enters a condenser where the vapor is condensed and cooled into liquid form. Refrigeration fans deliver cold air to the refrigeration space and generally provide air circulation within the refrigeration space. In the preferred embodiment of the present invention, the refrigeration device operates at peak hours and non-peak hours during a 24 hour cycle. More specifically, the refrigeration device is able to operate during both peak hours and non-peak hours based on the refrigeration device's performance and adjustments made by the present invention. For instance, if the temperature within the refrigeration device reaches an unsafe temperature during the peak hours when the refrigeration device is normally out of operation according to the present invention, the present invention allows the refrigeration device to operate in order to avoid exceeding the unsafe temperature.

The present invention utilizes an internal clock, a first time duration, a second time duration, a normal-operation temperature, a target temperature, and a maximum temperature during regulation of the refrigeration device. The internal clock is utilized to determine peak hours, non-peak hours, and times during a 24 hour cycle during which various actions are performed. The first time duration is a period of time during which thermal energy is stored by cooling the refrigeration device from a normal-operation temperature in order to reach the target temperature. The normal-operation temperature is the temperature to which the refrigeration device is cooled under typical circumstances. A real-time temperature of the refrigeration device is cooled from the normal-operation temperature to the target temperature over the first time duration during non-peak hours. The refrigeration device is cooled to the target temperature during non-peak hours, allowing the refrigeration device to avoid operation during normal peak hours and shifting the load of the refrigeration device to non-peak hours. The real-time temperature is periodically monitored over the first time duration in order to ensure that the real-time temperature does not reach the maximum temperature, a temperature that is deemed unsafe or otherwise undesirable for the refrigeration device and any contents within. Additionally, the real-time temperature is periodically monitored over the first time duration in order to determine if the real-time temperature has reached the target temperature. In the preferred embodiment of the present invention, the real-time temperature is monitored every five seconds.

The second time duration is a period of time during which the compressor and the fan are shut off and the refrigeration device remains out of operation, using thermal energy stored during the first time duration. The compressor and the fan are disabled over the second time duration during peak hours, eliminating the load of the refrigeration device during peak hours. The real-time temperature of the refrigeration device is allowed to steadily rise from the target temperature over the second time duration. As such, the target temperature is the temperature to which the real-time temperature must be cooled during the first time duration in order to prevent the real-time temperature from reaching the maximum temperature during the second time duration. The real-time temperature is periodically monitored over the second time duration as well in order to ensure that the real-time temperature does not reach the maximum temperature. The real-time temperature is then returned to the normal-operation temperature after the second time duration.

Figure 2:
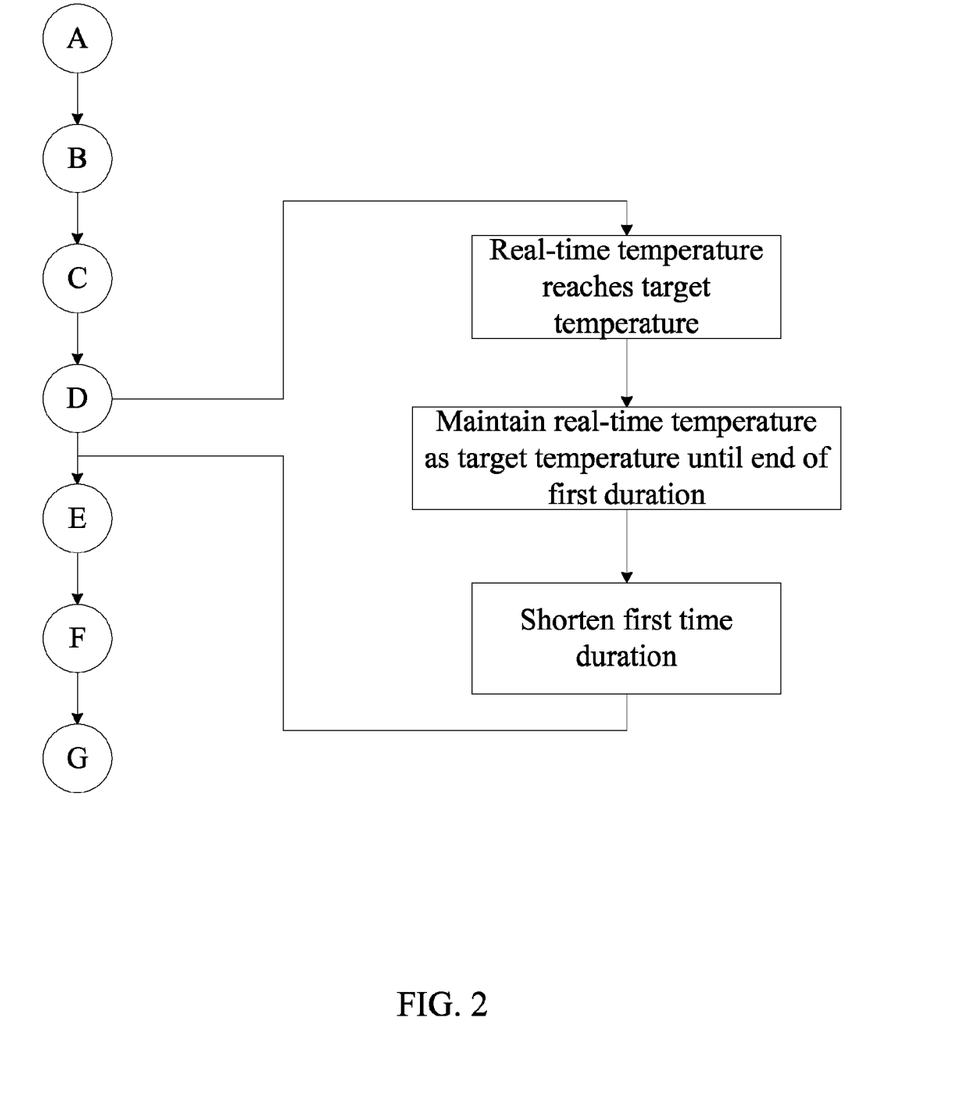
FIG. 2 is a flowchart illustrating the secondary process that is followed by the present invention if the real-time temperature reaches the target temperature prior to the end of the first time duration.

With reference to FIG. 2, if the real-time temperature reaches the target temperature during the first time duration, the real-time temperature is maintained as the target temperature until the end of the first time duration. The target temperature is maintained until the conclusion of the first time duration in order to ensure that the real-time temperature is able to safely rise over the second time duration without reaching the maximum temperature. The first time duration is then shortened if time remaining before the end of the first time duration is equal to an excessive idle period. The excessive idle period is a period of time in the first time duration during which the target temperature is maintained after the real-time temperature has reached the target temperature. The first time duration is shortened in order to prevent the refrigeration device from continuing to operate wastefully after the target temperature has been reached. In the preferred embodiment of the present invention, the excessive idle period is 30 minutes. The first time duration is shortened by the excessive idle period if the target temperature is reached with 30 minutes or more remaining before the end of the first time duration.

Figure 3:
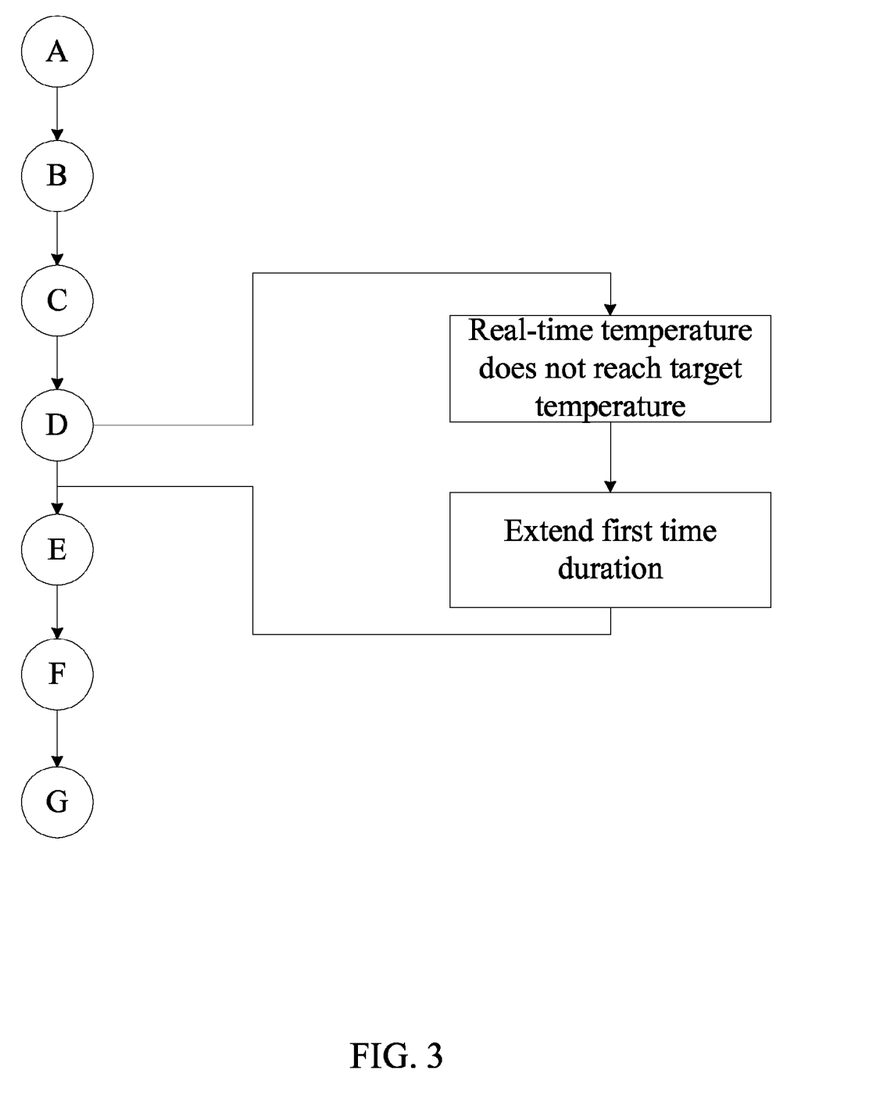
FIG. 3 is a flowchart illustrating the secondary process that is followed by the present invention if the real-time temperature does not reach the target temperature during the first time duration.

While the real-time temperature may reach the target temperature prior to the end of the first time duration, it is also possible for the real-time temperature to not reach the target temperature during the first time duration as well. As shown in FIG. 3, if the real-time temperature fails to reach the target temperature during the first time duration and if the time remaining before the end of the first time duration is equal to a first monitoring period, the first time duration is extended. The final monitoring period is the final period of time during which the real-time temperature is monitored in order to determine if the real-time temperature has reached the target temperature during the first time duration. If it is determined that the real-time temperature cannot reach the target temperature during the final monitoring period, the first time duration is extended. In the preferred embodiment of the present invention, the final monitoring period is 30 minutes and the first time duration is extended by the final monitoring period if the real-time temperature cannot reach the target temperature with 30 minutes or less remaining before the end of the first time duration.

Figure 4:
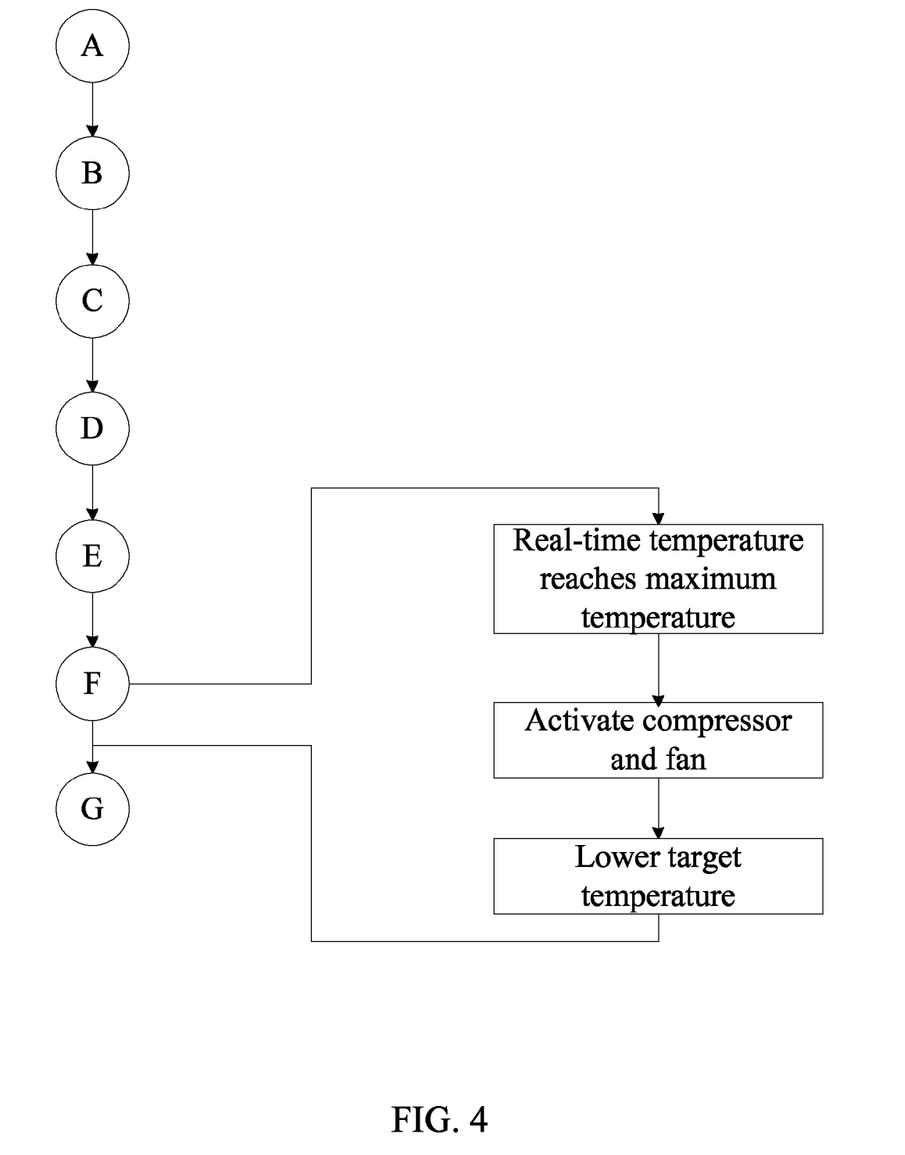
FIG. 4 is a flowchart illustrating the secondary process that is followed by the present invention if the real-time temperature reaches the maximum temperature during the second time duration.

Throughout the second time duration when the real-time temperature is allowed to slowly rise, it is important that the real-time temperature is unable to exceed the maximum temperature. In the event that the real-time temperature reaches the maximum temperature during the second time duration, the compressor and the fan are activated as shown in FIG. 4. This ensures that the refrigeration device is able to operate to prevent the real-time temperature from exceeding the maximum temperature.

Figure 5:
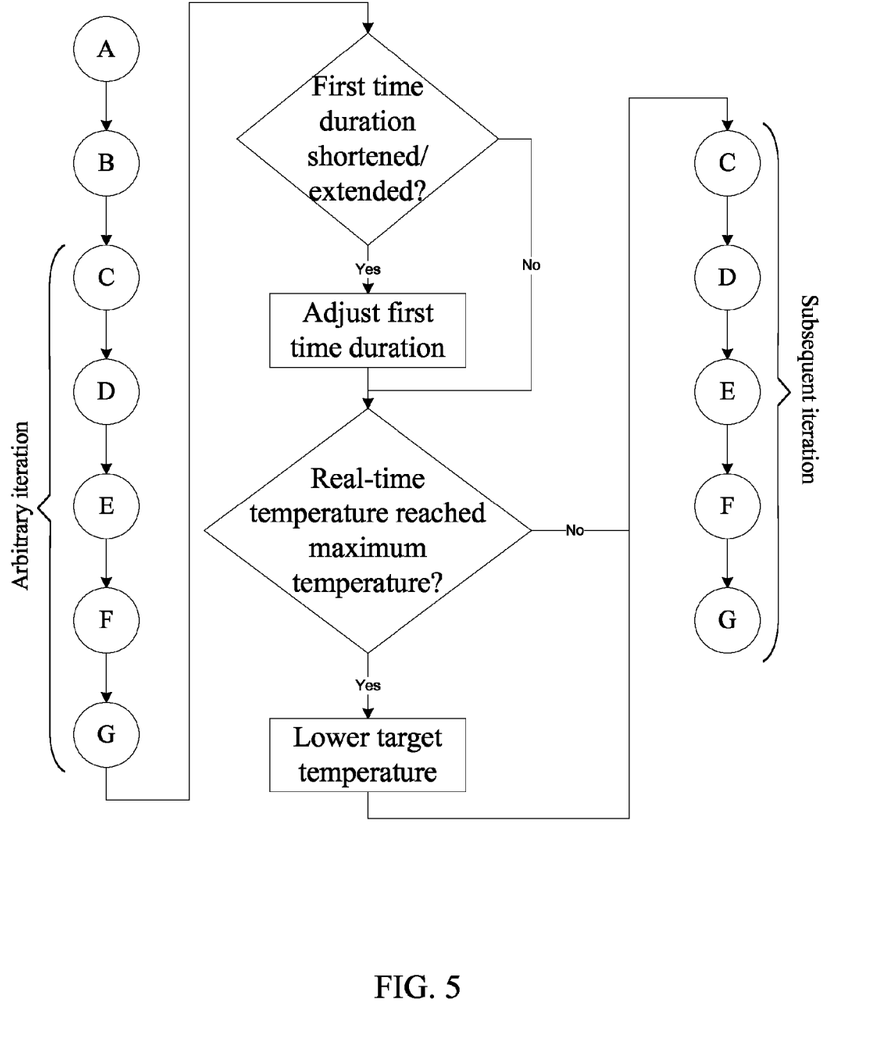
FIG. 5 is a flowchart illustrating the secondary process that is followed by the present invention when implementing adjustments in between the arbitrary iteration and the subsequent iteration.

During the 24 hour cycle, the aforementioned method is executed for an arbitrary iteration and for a subsequent iteration that occurs immediately after the arbitrary iteration. After the arbitrary iteration, the first time duration is adjusted accordingly for the subsequent iteration if the first time duration of the arbitrary iteration is shortened or extended as shown in FIG. 5. This ensures that the refrigeration device does not continue to operate wastefully when the real-time temperature has reached the target temperature and that the real-time temperature reaches the target temperature prior to the second time duration. In addition to adjusting the first time duration if needed, the target temperature of the subsequent iteration is lowered if the real-time temperature of the arbitrary iteration reaches the maximum temperature during the second time duration of the arbitrary iteration. In the preferred embodiment of the present invention, if the real-time temperature of the arbitrary iteration reaches the maximum temperature during the second time duration of the arbitrary iteration, the target temperature of the subsequent iteration is lowered by 1° Celsius. The adjustments to the first time duration of the arbitrary iteration are implemented prior to the subsequent iteration. Unlike the first time duration, the second time duration is not adjustable, allowing the compressor and the fan to remain disabled over the second time duration.

Figure 6:
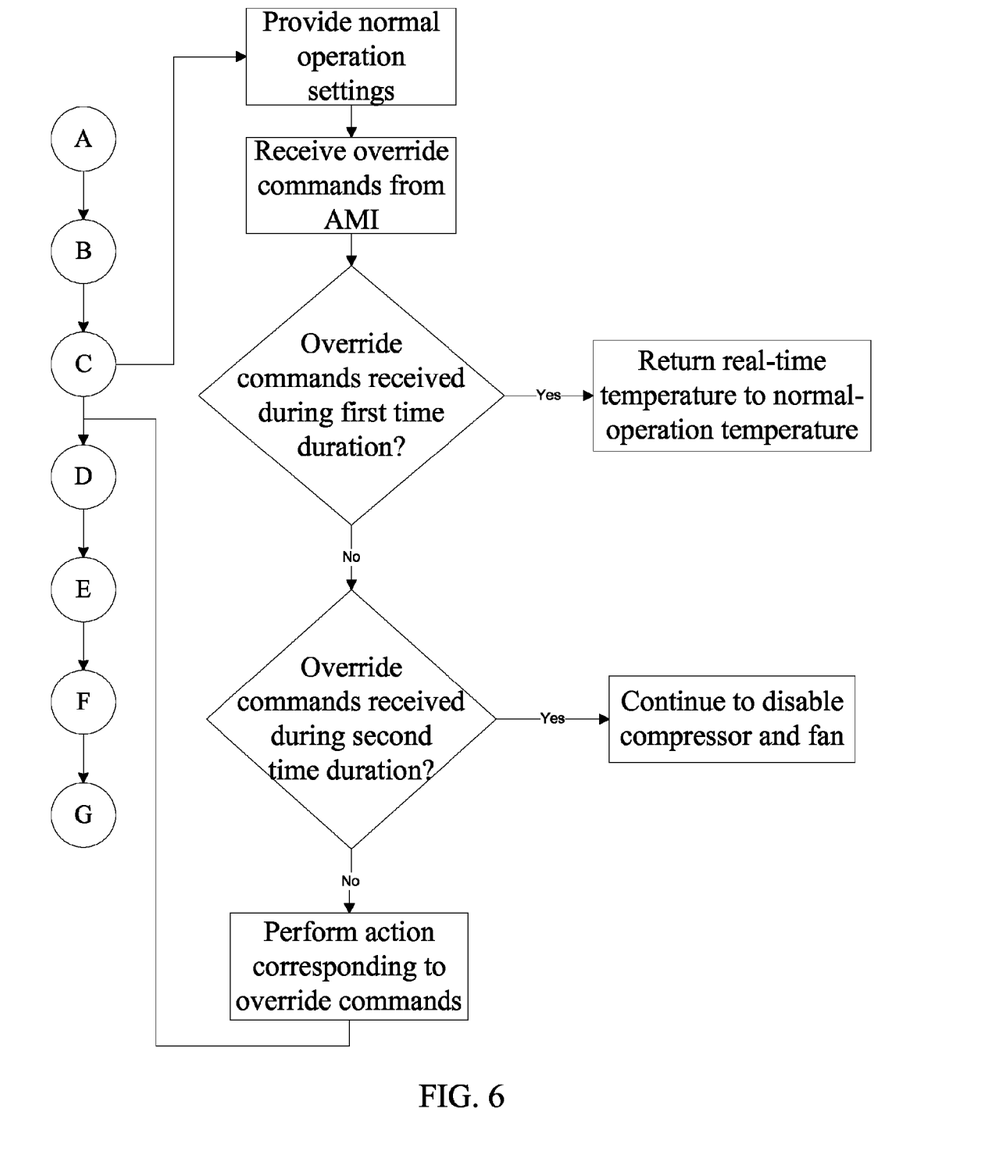
FIG. 6 is a flowchart illustrating the secondary process that is followed by the present invention when override commands are received from the advanced metering infrastructure (AMI) during the first time duration.
Figure 7:
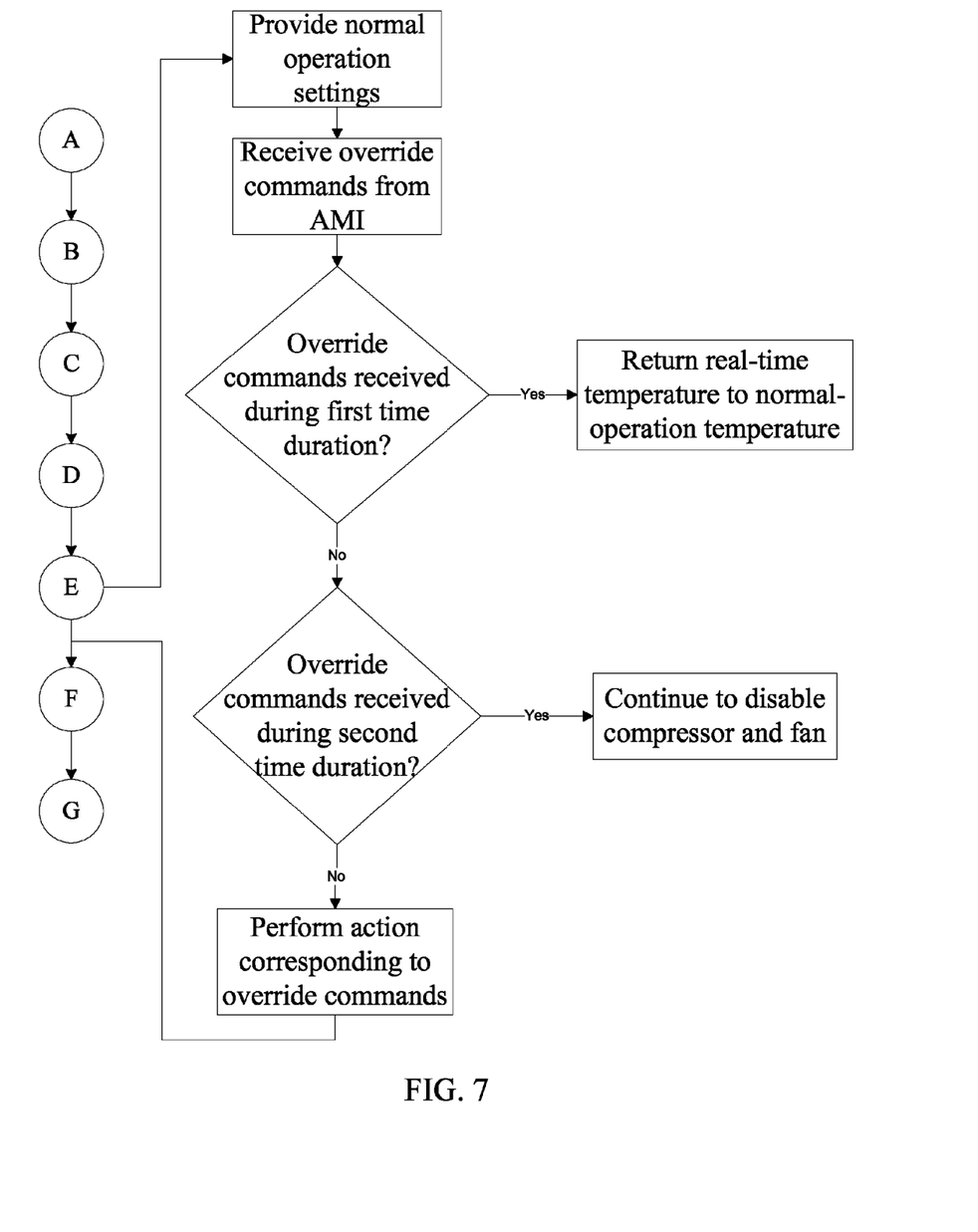
FIG. 7 is a flowchart illustrating the secondary process that is followed by the present invention when override commands are received from the AMI during the second time duration.

The present invention may be integrated with existing advanced metering infrastructure (AMI) that monitors the electrical power usage of the refrigeration device and that is communicably coupled to the refrigeration device. AMI systems generally allow for two-way communication between electrical devices and utility companies, service providers, and similar entities. In the context of the present invention, the AMI is utilized to perform demand-response actions based on override commands from a utility company, service provider, or similar entity. The present invention utilizes normal operation settings for the refrigeration device during peak hours. The normal operation settings are settings that allow the refrigeration device to maintain the normal-operation temperature. Under the normal operation settings, the compressor and the fan may be turned on or off as needed. In the preferred embodiment of the present invention, override commands are received from the AMI during times of heavy local power usage. Override commands received from the AMI take precedent over user inputted settings and adjusted settings during the 24 hour cycle. However, the real-time temperature of the refrigeration device is never permitted to exceed the maximum temperature despite the implementation of the override commands. If the override commands are received during the first time duration, the real-time temperature is returned to the normal-operation temperature by reverting the compressor and the fan to the normal operation settings as shown in FIG. 6. Returning the real-time temperature to the normal-operation temperature reduces the load of the refrigeration device on the local power grid during periods of heavy local power usage. This additionally ensures that the real-time temperature cannot exceed the maximum temperature. If the override commands are received during the second time duration, the compressor and the fan continue to remain disabled as shown in FIG. 7. However, the real-time temperature is again not permitted to exceed the maximum temperature.

Figure 8:
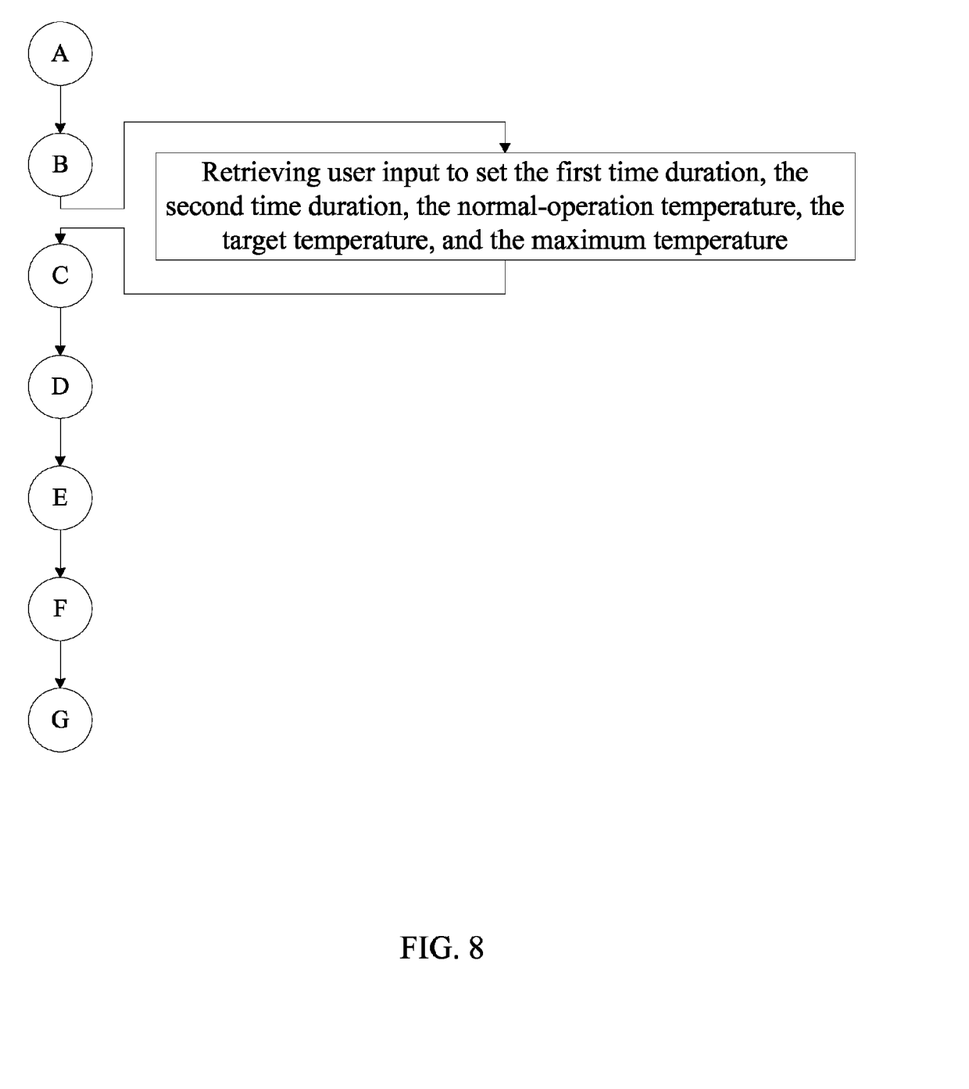
FIG. 8 is a flowchart illustrating the secondary process that is followed by the present invention when retrieving user input to set the first time duration, the second time duration, the normal-operation temperature, the target temperature, and the maximum temperature.

As shown in FIG. 8, the first time duration, the second time duration, the normal-operation temperature, the target temperature, and the maximum temperature may be set based on user input. The user input is received in order to set the first time duration, the second time duration, the normal-operation temperature, the target temperature, and the maximum temperature for the initial iteration. The user input may be received from a utility company, service provider, or similar entity during an initial setup for the refrigeration device. This user input may be received remotely or on-site.

Figure 9:
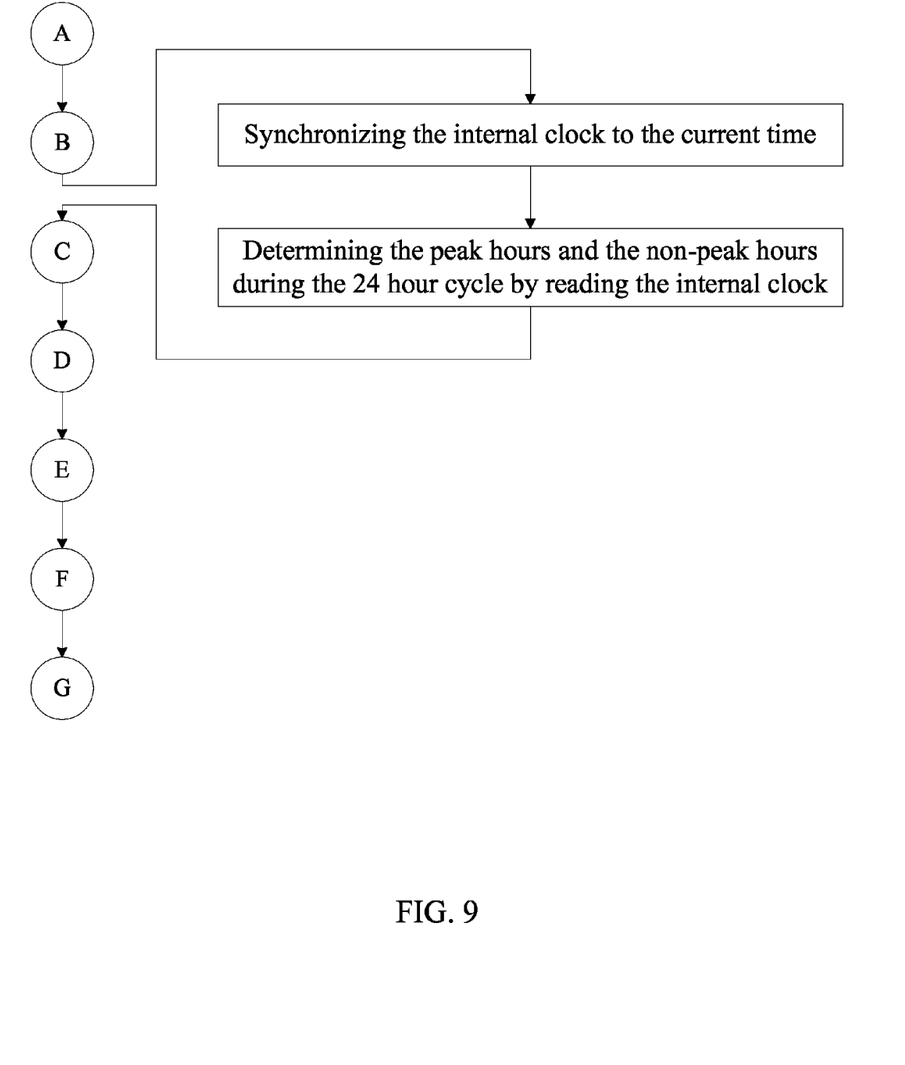
FIG. 9 is a flowchart illustrating the secondary process that is followed by the present invention in order to synchronize the internal clock to the current time.

The internal clock is utilized to establish the various periods of time over the 24 hour cycle during which the previously discussed actions occur. As such, the internal clock is synchronized to the current time in order to ensure that these actions occur at the desired times during the 24 hour cycle as shown in FIG. 9. The internal clock is read and compared to the peak hours and the non-peak hours in order to execute the relevant aforementioned time-appropriate actions during the peak hours and the non-peak hours. The present invention is then able to regulate the operation of the refrigeration device in order to store thermal energy during the non-peak hours for use during the peak hours.

While the present invention has been disclosed primarily with respect to a refrigeration device, various alternative embodiments of the present invention may be utilized in conjunction with additional appliances such as, but not limited to, hot water heaters.

Although the present invention has been explained in relation to its preferred embodiment, it is understood that many other possible modifications and variations can be made without departing from the spirit and scope of the present invention as hereinafter claimed.

What is claimed is:

1. A method of regulating a refrigeration device by storing thermal energy during non-peak hours for use during peak hours in order to shift refrigeration device operation to non-peak hours, the method comprises the steps of:
    (A) providing the refrigeration device, wherein the refrigeration device comprises a compressor and a fan and wherein the refrigeration device operates at peak hours and non-peak hours during a 24 hour cycle;
    (B) providing an internal clock, a first time duration, a second time duration, a normal-operation temperature, a target temperature, and a maximum temperature;
    (C) cooling a real-time temperature of the refrigeration device from the normal-operation temperature to the target temperature over the first time duration during non-peak hours in a manner that ensures the real-time temperature stays below the maximum temperature during the second time duration;
    (D) periodically monitoring the real-time temperature of the refrigeration device over the first time duration;
    (E) disabling the compressor and the fan over the second time duration during peak hours;
    (F) periodically monitoring the real-time temperature of the refrigeration device over the second time duration;
    (G) returning the real-time temperature of the refrigeration device to the normal-operation temperature after the second time duration.

2. The method of regulating a refrigeration device by storing thermal energy during non-peak hours for use during peak hours in order to shift refrigeration device operation to non-peak hours, the method as claimed in claim 1 comprises the steps of:
    providing that the real-time temperature does reach the target temperature during step (D);
    maintaining the real-time temperature as the target temperature until an end of the first time duration;
    shortening the first time duration, if time remaining before the end of the first time duration is equal to an excessive idle period.

3. The method of regulating a refrigeration device by storing thermal energy during non-peak hours for use during peak hours in order to shift refrigeration device operation to non-peak hours, the method as claimed in claim 2 comprises the step of:
    shortening the first time duration by the excessive idle period.

4. The method of regulating a refrigeration device by storing thermal energy during non-peak hours for use during peak hours in order to shift refrigeration device operation to non-peak hours, the method as claimed in claim 3, wherein the excessive idle period is 30 minutes.

5. The method of regulating a refrigeration device by storing thermal energy during non-peak hours for use during peak hours in order to shift refrigeration device operation to non-peak hours, the method as claimed in claim 1 comprises the step of:
    providing that the real-time temperature does not reach the target temperature during step (D);
    extending the first time duration, if the time remaining before the end of the first time duration is equal to a final monitoring period.

6. The method of regulating a refrigeration device by storing thermal energy during non-peak hours for use during peak hours in order to shift refrigeration device operation to non-peak hours, the method as claimed in claim 5 comprises the steps of:
    extending the first time duration by the final monitoring period.

7. The method of regulating a refrigeration device by storing thermal energy during non-peak hours for use during peak hours in order to shift refrigeration device operation to non-peak hours, the method as claimed in claim 6, wherein the final monitoring period is 30 minutes.

8. The method of regulating a refrigeration device by storing thermal energy during non-peak hours for use during peak hours in order to shift refrigeration device operation to non-peak hours, the method as claimed in claim 1 comprises the steps of:
    providing that the real-time temperature reaches the maximum temperature during step (F);
    activating the compressor and the fan.

9. The method of regulating a refrigeration device by storing thermal energy during non-peak hours for use during peak hours in order to shift refrigeration device operation to non-peak hours, the method as claimed in claim 1 comprises the steps of:
    executing steps (C) through (G) for an arbitrary iteration within the 24 hour cycle;

executing steps (C) through (G) for a subsequent iteration within the 24 hour cycle, wherein the subsequent iteration occurs immediately after the arbitrary iteration;

adjusting the first time duration for the subsequent iteration, if the first time duration of the arbitrary iteration is shortened or extended during step (D) of the arbitrary iteration;

lowering the target temperature of the subsequent iteration, if the real-time temperature of the arbitrary iteration reaches the maximum temperature during step (F) of the arbitrary iteration.

10. The method of regulating a refrigeration device by storing thermal energy during non-peak hours for use during peak hours in order to shift refrigeration device operation to non-peak hours, the method as claimed in claim 9 comprises the steps of:

providing that the real-time temperature of the arbitrary iteration does reach the maximum temperature during step (F) of the arbitrary iteration;

lowering the target temperature of the subsequent iteration by 1° Celsius.

11. The method of regulating a refrigeration device by storing thermal energy during non-peak hours for use during peak hours in order to shift refrigeration device operation to non-peak hours, the method as claimed in claim 1 comprises the steps of:

providing an advanced metering infrastructure (AMI), wherein the AMI monitors electrical power usage of the refrigeration device and the AMI is communicably coupled to the refrigeration device;

providing normal operation settings for the refrigeration device during peak hours;

receiving override commands from the AMI, wherein the override commands are sent by the AMI during times of heavy local power usage;

returning the real-time temperature to the normal-operation temperature by reverting the compressor and the fan to the normal operation settings, if the override commands are received during the first time duration;

continuing to disable the compressor and the fan, if the override commands are received during the second time duration.

12. The method of regulating a refrigeration device by storing thermal energy during non-peak hours for use during peak hours in order to shift refrigeration device operation to non-peak hours, the method as claimed in claim 1 comprises the steps of:

executing steps (C) through (G) for an initial iteration within the 24 hour cycle;

receiving user input to set the first time duration, the second time duration, the normal-operation temperature, the target temperature, and the maximum temperature for the initial iteration.

13. The method of regulating a refrigeration device by storing thermal energy during non-peak hours for use during peak hours in order to shift refrigeration device operation to non-peak hours, the method as claimed in claim 1 comprises the steps of:

synchronizing the internal clock to the actual time;

reading a current time from the internal clock;

executing step (C), if the current time falls within the non-peak hours.

* * * * *